(12) United States Patent
Chou et al.

(10) Patent No.: US 7,917,666 B2
(45) Date of Patent: Mar. 29, 2011

(54) COMPUTER SYSTEM AND METHOD FOR INDICATING A DISPLAY OUTPUT DEVICE THEREOF

(75) Inventors: Sun-Chung Chou, Tapei Hsien (TW); Nien-Yu Liao, Tapei Hsien (TW)

(73) Assignee: Acer Inc., Taipei Hsien (TW)

( * ) Notice: Subject to any disclaimer, the term of this patent is extended or adjusted under 35 U.S.C. 154(b) by 193 days.

(21) Appl. No.: 12/272,844

(22) Filed: Nov. 18, 2008

(65) Prior Publication Data

US 2009/0319697 A1 Dec. 24, 2009

(30) Foreign Application Priority Data

Jun. 18, 2008 (TW) ................................ 97122626 A

(51) Int. Cl.
*G06F 3/00* (2006.01)
*G06F 13/00* (2006.01)
(52) U.S. Cl. .............. 710/15; 710/62; 345/156; 345/1.1
(58) Field of Classification Search .............. 710/15–19, 710/62–64; 345/156, 520, 204, 1.1
See application file for complete search history.

(56) References Cited

U.S. PATENT DOCUMENTS

| | | | |
|---|---|---|---|
| 6,721,881 B1 * | 4/2004 | Bian et al. | |
| 6,862,695 B2 * | 3/2005 | Lin | ................................ 714/36 |
| 6,909,406 B2 * | 6/2005 | Wilburn et al. | |
| 7,136,078 B2 * | 11/2006 | Liao et al. | |
| 7,310,099 B2 * | 12/2007 | Wu et al. | |
| 7,334,054 B2 * | 2/2008 | Anderson | ........................ 710/15 |
| 2003/0174161 A1 * | 9/2003 | Wilburn et al. | |
| 2003/0227423 A1 * | 12/2003 | Arai et al. | ....................... 345/1.1 |
| 2004/0041832 A1 * | 3/2004 | Nguyen et al. | |
| 2004/0178968 A1 * | 9/2004 | Kizaki | |
| 2004/0212610 A1 * | 10/2004 | Hamlin | |
| 2004/0233188 A1 * | 11/2004 | Anderson | |
| 2006/0044314 A1 * | 3/2006 | Pandita et al. | |
| 2007/0076006 A1 * | 4/2007 | Knepper et al. | |
| 2008/0231546 A1 * | 9/2008 | Li | |
| 2008/0272984 A1 * | 11/2008 | Kizaki | |

* cited by examiner

*Primary Examiner* — Christopher B Shin
(74) *Attorney, Agent, or Firm* — Alan Kamrath; Kamrath & Associates PA

(57) ABSTRACT

A computer system and a method indicate the presence of a display output device. The method includes detecting whether the computer system has a display output or not. If detected, the display output device is selected according to the setting of a BIOS, and an indicator signals an indication to notify a user.

19 Claims, 3 Drawing Sheets

COMPUTER SYSTEM AND METHOD FOR INDICATING A DISPLAY OUTPUT DEVICE THEREOF

BACKGROUND OF THE INVENTION

1. Field of the Invention

The present invention relates to a computer system and an indicating method and, especially, to a computer system and an indicating method for indicating a display output device.

2. Description of the Related Art

With advances in technology, the central processing unit is becoming more and more powerful. Making central processing units with a built-in display module has become a trend of future developments. In addition, with computer system cost considerations, one motherboard can be utilized with different models of central processing units. Thus, the central processing unit on the motherboard can be the one with a display module or the one without a display module. In the prior art, motherboards are not able to distinguish differences between the central processing unit on the motherboard having the display module or not. When assembling or configuring the computer system, user(s) may not know if any display output device is required for the computer system. Besides, if there is a plurality of display output devices installed in the computer system, it would have a plurality of port interfaces. Also, users may not know which port interface the monitor should be connected with. The above situations are very likely to confuse users when using the computer system.

Therefore, it is advantageous to provide a new computer system and an indicating method for solving problems in the prior art.

SUMMARY OF THE INVENTION

It is a main object of the present invention to provide a computer system for indicating a display output device.

It is another object of the present invention to provide a method for indicating a display output device.

In order to achieve the above objects, the present invention provides a computer system comprising a motherboard, a central processing unit, an indicator, and a memory module. The central processing unit is installed on the motherboard. The indicator is electrically connected with the central processing unit and used to signal an indication or a warning to notify a user. The memory module is installed on the motherboard and electrically connected with the central processing unit. The memory module is used for storing a BIOS. The BIOS performs an indicating procedure when the computer system is booted in order to indicate a display output device.

The present invention provides a method for indicating a display output device includes: detecting whether the computer system has a display output or not; if yes, selecting a display output device according to the setting of a BIOS; and controlling an indicator to signal an indication to notify a user.

REFERENCE NUMERALS

| | | | |
|---|---|---|---|
| computer system | 10 | motherboard | 11 |
| central processing unit | 20 | indicator | 30 |
| memory module | 40 | basic input output system(BIOS) | 41 |
| identification mark database | 42 | | |
| independent power supply | 31 | | |
| module sensor | 50 | case | 60 |

DETAILED DESCRIPTION OF THE PREFERRED EMBODIMENT

The advantages and innovative features of the invention will become more apparent from the following detailed description when taken in conjunction with the accompanying drawings.

Figure 1:
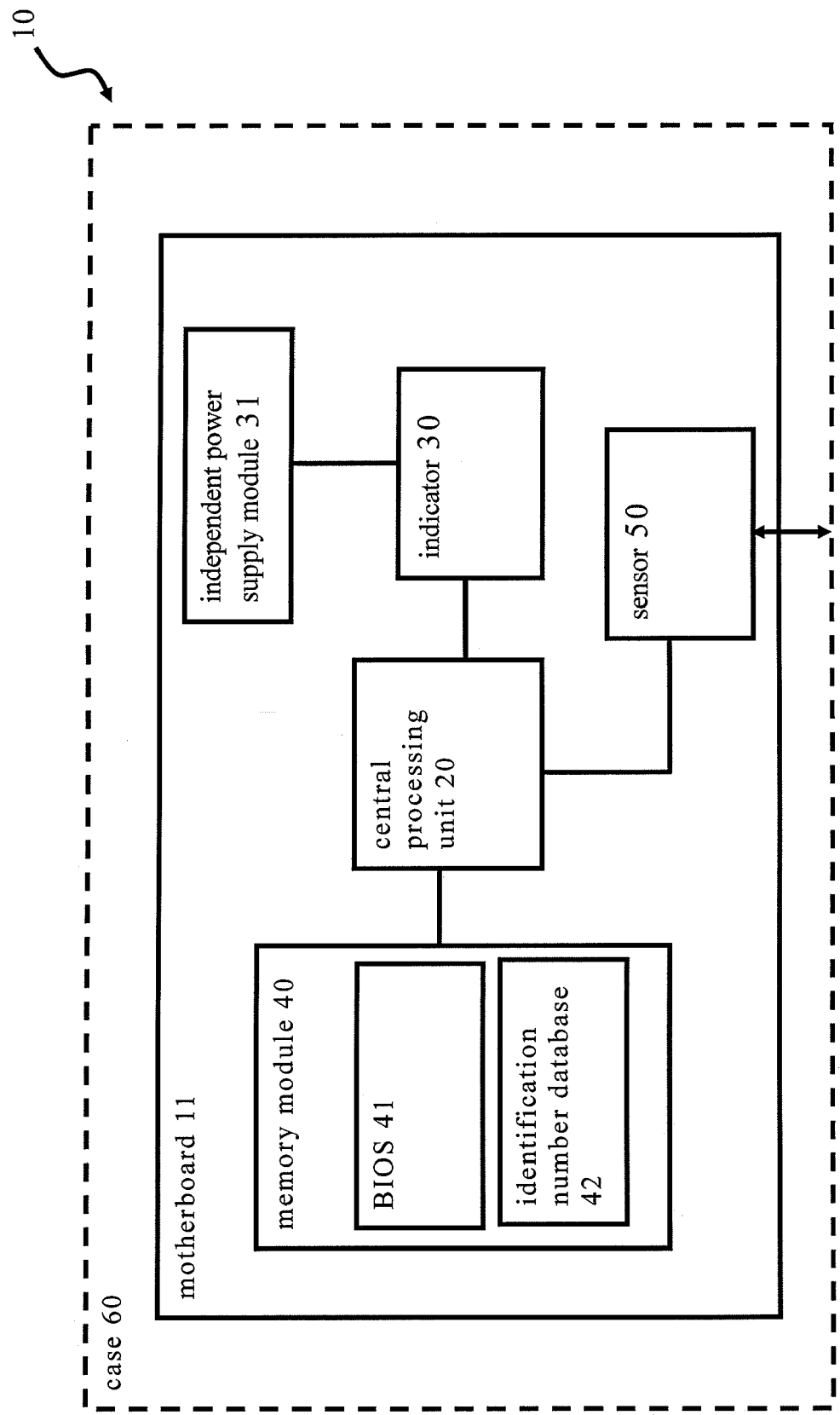
FIG. 1 illustrates a diagram of the structure of a computer system in accordance with one embodiment of the present invention.

FIG. 1 illustrates illustrating a diagram of the structure of a computer system in accordance with one embodiment of the present invention.

As shown in FIG. 1, the present invention provides a computer system 10 comprising a motherboard 11, a central processing unit 20, an indicator 30, an independent power supply module 31, a memory module 40, a sensor 50, and a case 60 in accordance with one embodiment of the present invention. The motherboard 11 is disposed within the case 60. The central processing unit 20, the indicator 30, the independent power supply module 31, the memory module 40, and the sensor 50 are installed on the motherboard 11.

The indicator 30 is electrically connected with the central processing unit 20. The indicator 30 is used for signaling an indication or a warning to tell a user whether an image display device (not shown) exists in the computer system 10. It is noted that indicator 30 is not limited to be installed on the motherboard 11 or disposed within the case 60. As long as the objective of notifying the user can be achieved, the indicator 30 of the present invention can be installed anywhere in the computer system 10.

In this embodiment, the indicator 30 signals the user by a blinking light, but which is not used to limit the present invention. Also, in this embodiment, the indicator 30 is a light-emitting device, such as a light-emitting diode, but which is not used to limit the present invention. In addition, the indicator 30 is electrically connected with the independent power supply module 31 to receive power, so that the indicator 30 can continue signaling when the computer 10 is shut down or unplugged. The independent power supply module 31 can be a battery installed on the motherboard 11, but which is not used to limit the present invention. In the present invention, the method of signaling an indication or a warning by using the indicator 30 will be described in detail below.

The memory module 40 is electrically connected with the central processing unit 20 through a south bridge chip (not shown) or other control chips, both are not used to limit the present invention. The memory module 40 is used for storing a Basic Input Output System (BIOS) 41 and an identification mark database 42. The BIOS 41 is used for performing the necessary processing procedure when the computer system 10 is booted.

The identification mark database 42 stores various types of identification marks for different central processing units so the BIOS 41 can verify the type of the central processing unit 20 when booting the computer system 10. Accordingly, the central processing unit 20 can verify if the motherboard 11 is with or without a display module therein, so that the indicator 30 signals based on the verification to notify the user. The sensor 50 is electrically connected with the central processing unit 20 and the case 60 of the computer system 10 simultaneously in order to detect whether the case 60 is opened. When the case 60 is opened, the present invention executes a mechanism of intrusion protection. In the present invention, the method of executing the mechanism of intrusion protection by using the sensor 50 will be described in detail below.

Figure 2:
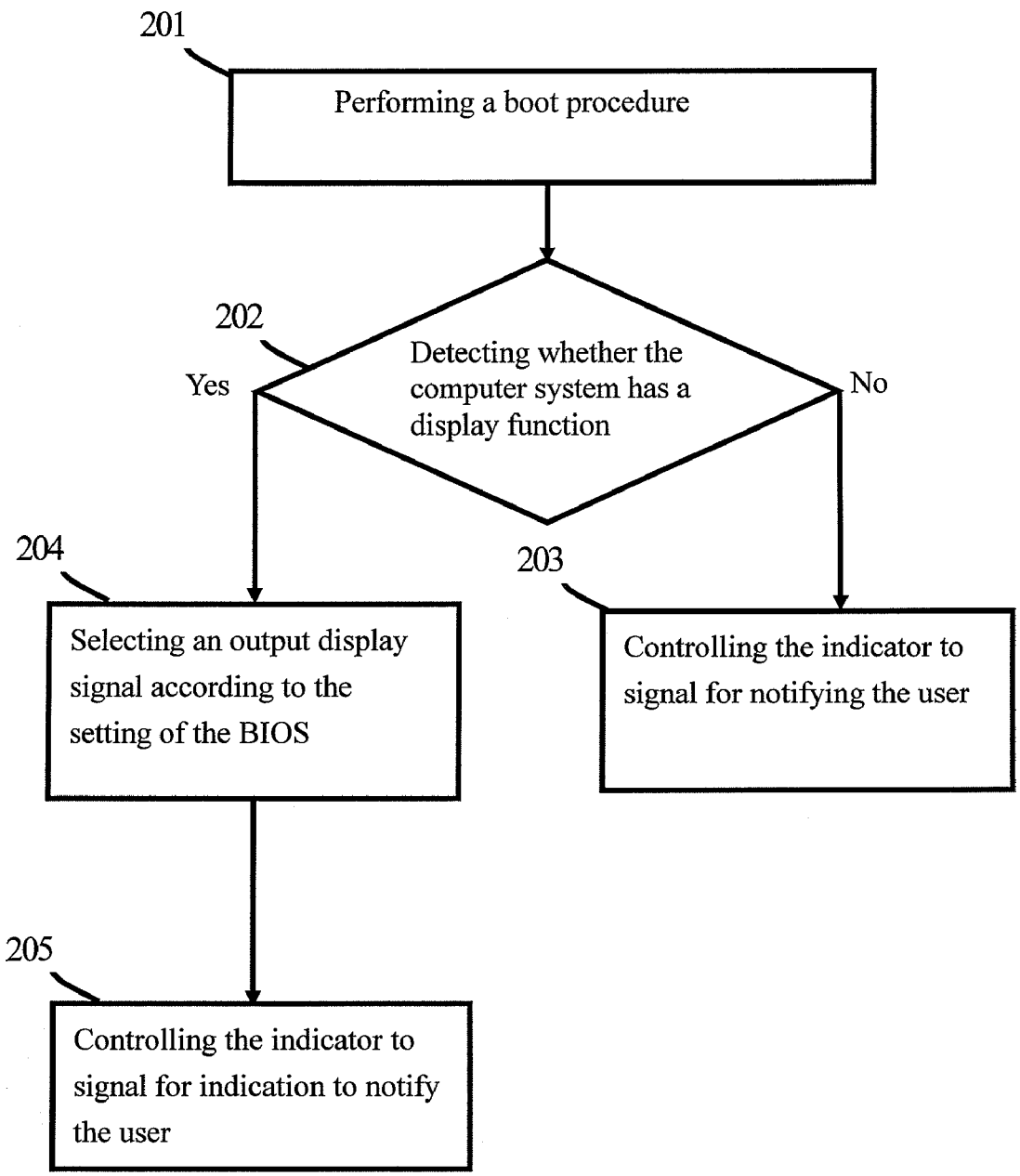
FIG. 2 illustrates a flowchart indicating a display output device in accordance with one embodiment of the present invention.

Please refer to FIG. 2 showing a flowchart indicating a display output device in accordance with one embodiment of the present invention. It should be noted that although the following illustrates the method for indicating a display output device in the present invention by the example of the computer system 10 with the indicator 30, the method for indicating a display output device in the present invention is not limited to use in the computer system 10.

First, the present invention performs step 201: performing a boot procedure.

The computer system 10 firstly performs a boot procedure. At this step, the boot procedure is performed by the BIOS 41.

Next, the present invention performs step 202: detecting whether the computer system has a display output device.

In step 202, the BIOS 41 detects whether the computer system 10 has a display output device. In this embodiment, the BIOS 41 detects whether the central processing unit 20 has a display module and whether the motherboard 11 has a display output device.

In step 202, the BIOS 41 reads the identification mark of the central processing unit 20 and matches it with the identification mark database 42 to identify the type of the central processing unit 20 to determine whether the central processing unit 20 has a display module built therein.

Meanwhile, the BIOS 41 detects whether the motherboard 11 has one or more display output devices. The display output device can be a display adapter installed in the motherboard 11 or a display module built-in the motherboard 11, but which are not used to limit the present invention.

If the computer system 10 does not have a display output device, the present invention performs step 203: controlling the indicator to signal for notifying the user.

At this step, the indicator 30 signals the user that the computer system 10 does not have the display output device so the user needs to install a display output device in the computer system 10 to continue the follow-up boot procedure, and the BIOS 41 stops performing the boot procedure.

If the computer system 10 has a display output device, the present invention performs step 204: selecting an output display signal according to the setting of the. BIOS.

If the computer system 10 has only one display module, either the display module is the built-in display module of the central processing unit 20 or the display output device is installed in the motherboard 11, the BIOS 41 can control the display module or the display output device to output for the display signal.

If the computer system 10 has more than one display module, for example, the central processing unit 20 has the built-in display module and the motherboard 11 has one or more display output devices, then the present invention determines which display module is used to output the display signal according to the setting of the BIOS 41. The setting of the BIOS 41 mentioned above can be based on the user's setting.

Alternatively, the setting of the BIOS 41 can be according to the sequence of the connection ports of the display output devices. Either one can be used to determine which display output device is the signal output device with the highest priority, but which are not used to limit the present invention.

Next, the present invention performs step 205: controlling the indicator to signal an indication to notify the user.

At this step, the BIOS 41 controls the indicator 30 to signal to notify the user which display output device is now outputting the display, whereby the user can understand which display output device should connect with a monitor connector (not shown) for outputting the display.

In this embodiment, the indicator 30 can also notify the user of the properties of the display output device. For example, if the port interface of the display output device is a Digital Visual Interface (DVI), the indicator 30 can signal for different indications, such as different colors or different blink frequencies, to notify the user that the DVI supports a single-link mode or a dual-link mode. If the port interface of the display output device is a High Definition Multimedia Interface (HDMI), the indicator 30 can also be used to notify the user of the present version of the HDMI.

Besides, the user can be notified whether the display output device is now outputting the display signal by using the indicator 30 or installing another indicator. If there is an indicating signal but no image shown on the monitor, it can be ascertained that something is wrong with the monitor or the connection with the monitor, whereby the user can figure out some simple problem exists and solve the problem by him/herself.

Because the indicator 30 is connected with the independent power supply module 31, the indicator 30 can signal an indication constantly whether the computer system 10 is shut down or unplugged. Thus, a connection error can be avoided when the user moves the computer system 10 or re-plugs for connection with the monitor.

Since the indicator 30 signals an indication constantly, it can continue to indicate to the user even when the computer system 10 is shut down or unplugged. However, it is also possible that the user may change the hardware devices in the computer system 10 by himself or herself. Therefore, in this embodiment, the computer system 10 may further execute a mechanism of intrusion protection to perform again the process of indicating a display output device.

Figure 3:
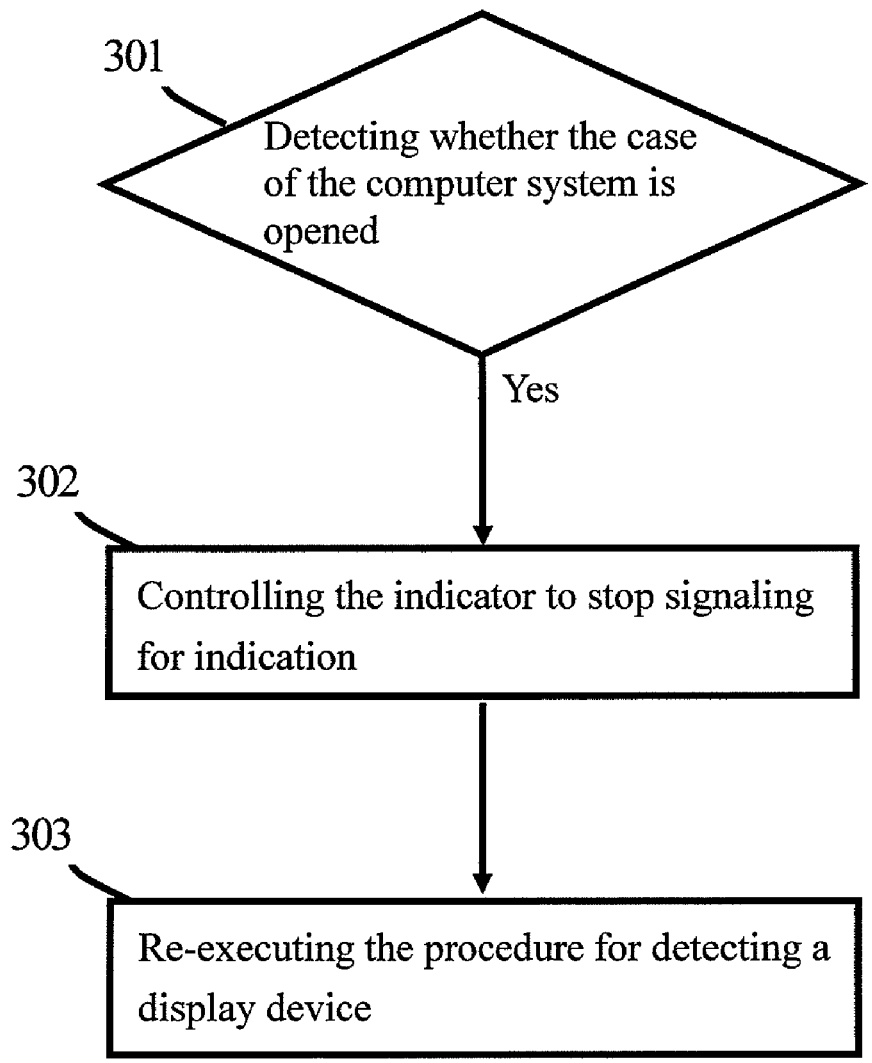
FIG. 3 illustrates a flowchart indicating a display output device by re-executing an instruction in accordance with another embodiment of the present invention.

Next, please refer to FIG. 3 illustrating a flowchart of re-executing the instruction to indicate a display output device in accordance with one embodiment of the present invention.

First, the present invention performs step 301: detecting whether the case of the computer system is opened.

The sensor 50 of the computer system 10 detects whether the case 60 is opened by the user when the computer system 10 is booted. If the case 60 is opened, it could mean that the hardware device in the computer system 10 is moved or changed.

If the detection of step 301 is yes, the present invention performs step 302: controlling the indicator to stop signaling.

At this step, the BIOS 41 executes a mechanism of intrusion protection for controlling the indicator 30 to stop signaling.

Next, the present invention performs step 303: re-executing the procedure for detecting a display device.

At this step, the BIOS 41 re-executes the procedure for indicating a display output device (i.e. returning to step 202 and performing the procedure again) to make sure what the display output device in the computer system 10 is.

With the above-mentioned procedure, the user can be precisely notified of what the present display output device of the computer system 10 is and is not confused when using.

It is noted that the method for indicating a display output device in the present invention is not limited to the sequence of steps as mentioned above. As long as the object of the present invention is achieved, the sequence of steps mentioned above can be varied.

It is noted that the above-mentioned embodiments are only for illustration, and it is intended that the present invention cover modifications and variations of this invention provided they fall within the scope of the following claims and their equivalents. Therefore, it will be apparent to those skilled in the art that various modifications and variations can be made to the structure of the present invention without departing from the scope or spirit of the invention.

What is claimed is:

1. A computer system comprising:
   a motherboard;
   a central processing unit installed on the motherboard;
   an indicator electrically connected with the central processing unit to signal an indication to notify a user; and
   a memory module installed on the motherboard and electrically connected with the central processing unit and stored with a basic input output system (BIOS), wherein the BIOS performs an indicating procedure to detect whether the computer system has a display output device or not when the computer system is booted; if the computer system has the display output device, according to a setting of the BIOS, a display signal is selected for outputting and the indicator is controlled to signal an indication.

2. The computer system as claimed in claim 1, wherein the BIOS further determines if the computer system has more than one display output device, the determining including detecting whether the central processing unit has a display module or whether the motherboard has a display output device; if the computer system has more than one display output device, the BIOS determines a sequence of outputting the display signal based on a sequence of connection ports of the display output devices and controls the indicator to signal the display signal to notify the user.

3. The computer system as claimed in claim 2, wherein the memory module further comprises an identification mark database, and wherein the BIOS reads an identification mark of the central processing unit and verifies with the identification mark database to determine if the central processing unit has the display module.

4. The computer system as claimed in claim 1, when the BIOS detects the computer system has no display output device, the indicator is controlled to signal to notify the user.

5. The computer system as claimed in claim 1, wherein the indicator is a light-emitting device.

6. The computer system as claimed in claim 5, wherein the indicator is electrically connected with an independent power supply module.

7. The computer system as claimed in claim 6, wherein the computer system further comprises a sensor, and wherein the BIOS further detects whether a case of the computer system is opened by using the sensor; if detected that the computer system is opened, the BIOS controls the indicator to stop signaling and re-executes the indicating procedure.

8. The computer system as claimed in claim 5, wherein the indicator further indicates a property of the display output device.

9. The computer system as claimed in claim 5, wherein the indicator indicates whether the display signal is being outputted.

10. A method applied in a computer system for indicating a display output device, the method comprising:
    detecting whether the computer system has a display output device;
    if the computer system has the display output device, selecting a display signal for outputting according to a setting of a basic input output system (BIOS); and
    controlling an indicator to signal the display signal to notify a user.

11. The method as claimed in claim 10 further comprising:
    determining whether the computer system has more than one display output device, the determining including detecting whether a central processing unit has a display module or whether a motherboard of the computer system has a display output device;
    if the computer system has more than one display output device, sequencing the display signal based on a sequence of connection ports of the display output devices.

12. The method as claimed in claim 11 further comprising storing an identification mark database.

13. The method as claimed in claim 12 further comprising reading an identification mark of the central processing unit and verifying with the identification mark database to determine whether the central processing unit has the display module.

14. The method as claimed in claim 10 further comprising:
    if the computer system has no display output device, controlling the indicator to signal to notify the user.

15. The method as claimed in claim 14, wherein controlling the indicator to signal is blinking a light of the indicator.

16. The method as claimed in claim 15 further comprising controlling the indicator to signal constantly.

17. The method as claimed in claim 16 further comprising:
    detecting whether a case of the computer system is opened;
    if detecting the computer system is opened, controlling the indicator to stop signaling; and
    re-executing the indicating procedure.

18. The method as claimed in claim 15 further comprising indicating a property of the display output device installed in the computer system by using the indicator.

19. The method as claimed in claim 15 further comprising indicating whether the computer system is outputting the display signal by using the indicator.

* * * * *